US011376791B2

(12) United States Patent
Hierro et al.

(10) Patent No.: US 11,376,791 B2
(45) Date of Patent: Jul. 5, 2022

(54) CONTAMINANT BARRIER

(71) Applicant: HEWLETT-PACKARD DEVELOPMENT COMPANY, L.P., Houston, TX (US)

(72) Inventors: Lluis Hierro, Sant Llorenc d'Hortons (ES); Pol Morral, Sant Cugat del Valles (ES); Sergi Culubret, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 942 days.

(21) Appl. No.: 16/070,753

(22) PCT Filed: May 12, 2016

(86) PCT No.: PCT/US2016/031998
§ 371 (c)(1),
(2) Date: Jul. 17, 2018

(87) PCT Pub. No.: WO2017/196324
PCT Pub. Date: Nov. 16, 2017

(65) Prior Publication Data
US 2021/0206101 A1    Jul. 8, 2021

(51) Int. Cl.
*B29C 64/20* (2017.01)
*B29C 64/165* (2017.01)
(Continued)

(52) U.S. Cl.
CPC .......... *B29C 64/364* (2017.08); *B29C 64/153* (2017.08); *B29C 64/165* (2017.08);
(Continued)

(58) Field of Classification Search
CPC ........ B41J 29/13; B22F 12/224; B29C 64/25; B29C 64/236; B29C 64/364
See application file for complete search history.

(56) References Cited

U.S. PATENT DOCUMENTS

| 5,252,264 A | 10/1993 | Forderhase et al. |
| 6,267,466 B1 * | 7/2001 | Gudaitis ................ B41J 19/207 347/11 |

(Continued)

FOREIGN PATENT DOCUMENTS

| CN | 103935037 | 7/2014 |
| CN | 105014976 | 11/2015 |

(Continued)

OTHER PUBLICATIONS

Machine translation of DE 102012012413, retrieved on Jul. 1, 2021 from the European Patent Office (Year: 2014).*

(Continued)

*Primary Examiner* — Joseph S Del Sole
*Assistant Examiner* — Ariella Machness
(74) *Attorney, Agent, or Firm* — Dierker & Kavanaugh PC

(57) ABSTRACT

In one example, an apparatus includes a carriage to carry a payload through a manufacturing space at the urging of control elements in a control space and a belt movable with the carriage to block contaminants in the manufacturing space from passing to the control space along a carriage travel path.

8 Claims, 6 Drawing Sheets

(51) Int. Cl.
*B33Y 30/00* (2015.01)
*B33Y 40/00* (2020.01)
*B29C 64/364* (2017.01)
*B29C 64/329* (2017.01)
*B29C 64/153* (2017.01)

(52) U.S. Cl.
CPC ............ *B29C 64/20* (2017.08); *B29C 64/329* (2017.08); *B33Y 30/00* (2014.12); *B33Y 40/00* (2014.12)

(56) References Cited

U.S. PATENT DOCUMENTS

| | | | |
|---|---|---|---|
| 6,375,874 B1 * | 4/2002 | Russell | B33Y 40/00 264/28 |
| 8,827,684 B1 | 9/2014 | Schumacher et al. | |
| 9,108,360 B2 | 8/2015 | Comb et al. | |
| 2011/0227999 A1 * | 9/2011 | Tachibana | B41J 2/1714 347/34 |
| 2016/0009028 A1 | 1/2016 | Tjellesen et al. | |

FOREIGN PATENT DOCUMENTS

| | | | | |
|---|---|---|---|---|
| DE | 102012012413 | | 1/2014 | |
| DE | 102012012413 A1 * | 1/2014 | ............ B29C 64/25 |
| DE | 102012014841 | | 1/2014 | |
| EP | 0949993 | | 11/2002 | |
| EP | 1600281 | | 11/2005 | |
| EP | 1657048 | | 5/2006 | |
| EP | 2946909 A1 * | 11/2015 | .......... B29C 64/165 |
| JP | 2001-150557 | | 6/2001 | |
| WO | WO-2015108849 | | 7/2015 | |

OTHER PUBLICATIONS

Engelmann, Fabscan Affordable 3D Laser Scanning of Physical Objects, Sep. 30, 2011, RWTH AAchen University, DE.
International Search Report and Written Opinion for International Publication No. PCT/US2016/031998 dated Feb. 3, 2017, 12 pages.

* cited by examiner

US 11,376,791 B2

CONTAMINANT BARRIER

BACKGROUND

Additive manufacturing machines, sometimes called 3D printers, produce objects by building up layers of material. Digital data may be processed into slices each defining that part of a layer or layers of build material to be formed into the object. In some additive manufacturing machines, the object slices are formed by a powdered build material spread in layers over the work area. Heat may be used to fuse together the particles in each of the successive layers of powder to form a solid object. Heat to fuse build material in each layer may be generated, for example, by applying a liquid fusing agent to the powder in the pattern of a single slice of the object and then exposing the patterned area to a light or other energy source. The fusing agent absorbs energy to help sinter, melt or otherwise fuse the patterned powder. Manufacturing may proceed layer by layer and slice by slice until the object is complete.

DRAWINGS

The figures are not necessarily to scale. The same part numbers designate the same or similar parts throughout the figures.

DESCRIPTION

In some additive manufacturing machines, a carriage carries a dispenser through the manufacturing space back and forth over a build area to dispense a liquid fusing agent on to powdered build material in the build area. Part of the carriage traverses an opening along the border between the manufacturing space and a control space that contains drive train, wiring and other control elements for the carriage and the dispenser. This opening presents a pathway for heat, debris and other contaminants in the manufacturing space to enter the control space. A barrier has been developed to help block contaminants in the manufacturing space from entering the control space along the carriage travel path. In one example, a carriage system includes: a carriage to carry a payload through a manufacturing space at the urging of control elements in a control space; and a barrier movable with the carriage to block contaminants in the manufacturing space from passing to the control space along the carriage travel path. In one example, the barrier is a passive device that is movable at the urging of the carriage. In one example, the barrier is implemented as a belt connected to the carriage in an endless loop that moves around a series of idler rollers.

These and other examples described below and shown in the figures illustrate but do not limit the scope of the patent, which is defined in the Claims following this Description.

Figure 1:
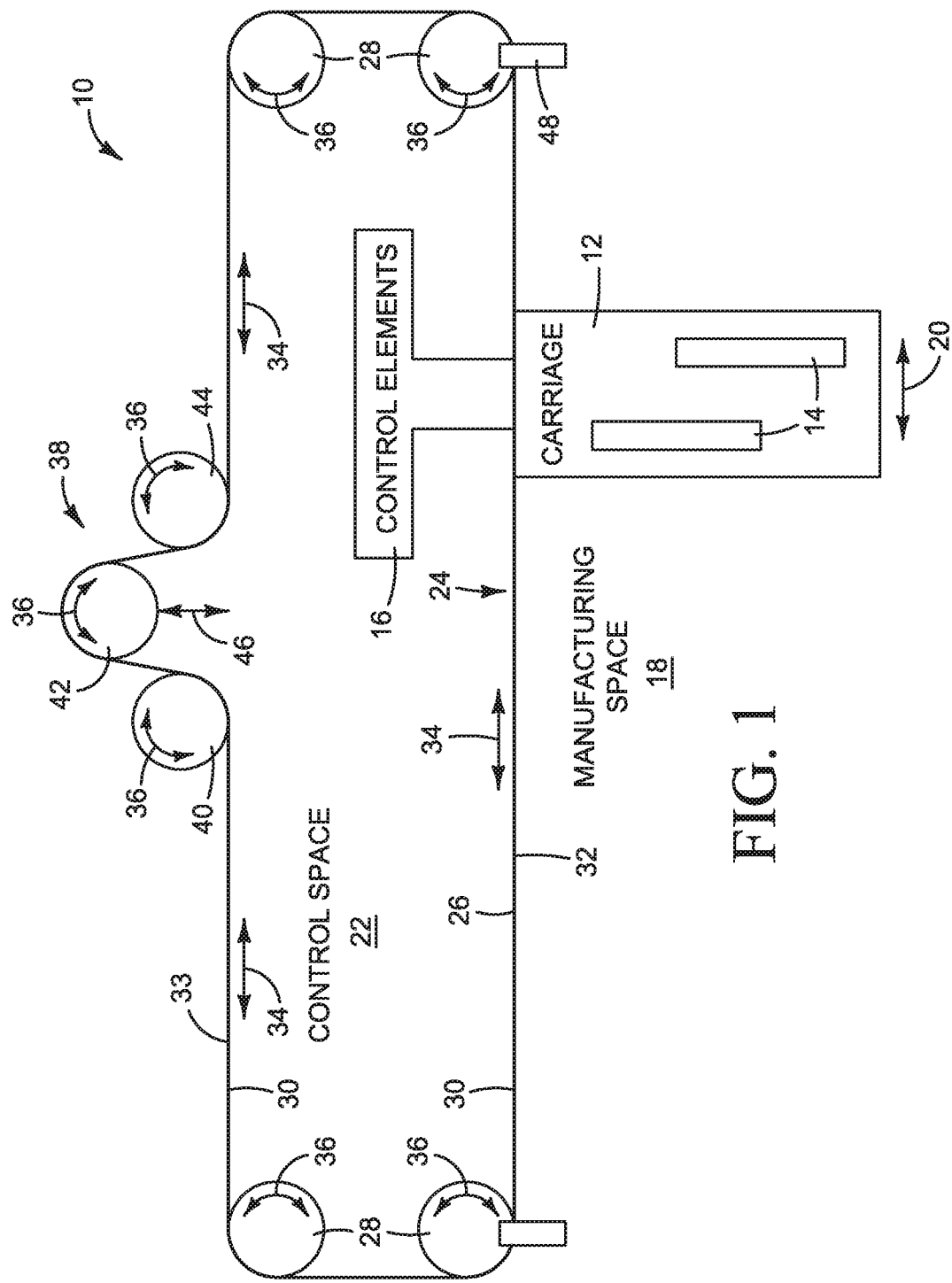
FIG. 1 is a plan view diagram illustrating one example of a contaminant barrier between a manufacturing space and a carriage control space.
Figure 2:
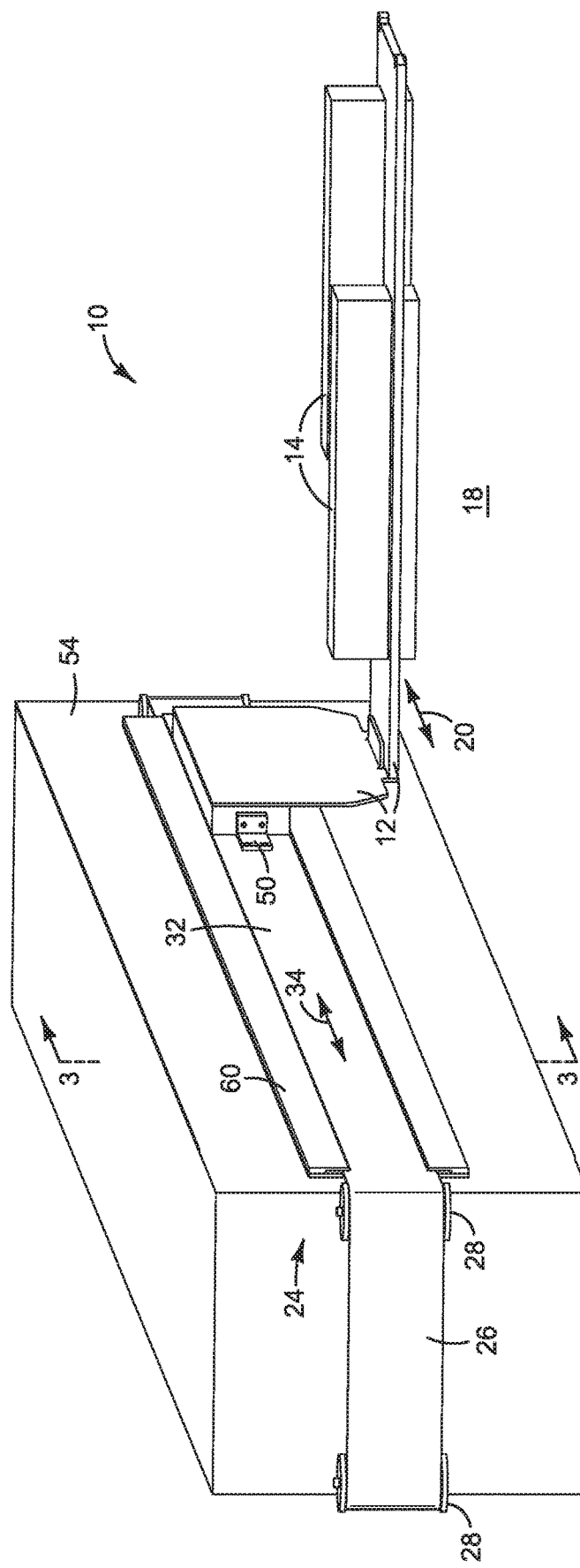
FIG. 2 is an isometric illustrating one implementation for the example contaminant barrier shown in FIG. 1.

FIG. 1 is a plan view diagram illustrating one example of a movable contaminant barrier between a manufacturing space and a carriage control space, such as might be implemented in an additive manufacturing machine. FIGS. 2-5 are isometrics illustrating one implementation for the example contaminant barrier 24 shown in FIG. 1. Referring first to FIG. 1, a carriage system 10 includes a carriage 12 carrying a payload 14, and control elements 16. Carriage 12 carries payload 14 back and forth through a manufacturing space 18, as indicated by arrows 20. Control elements 16 in a control space 22 are protected from contaminants in manufacturing space 18 by a barrier 24. Control elements 16 in FIG. 1 may include, for example, a motor, drive train, control circuitry, and wiring to control carriage 12 moving through manufacturing space 18. Control elements 16 may also include supply lines, control circuitry and wiring for payload 14. For example, in an additive manufacturing machine that uses a liquid fusing agent, carriage payload 14 may include fusing agent dispensers with control elements located behind barrier 24.

Barrier 24 moves with carriage 12 to allow carriage 12 to traverse a path between control space 22 and manufacturing space 18. In this example, barrier 24 is implemented as a belt 26 connected to carriage 12 and wrapping idler rollers 28. In one example, carriage 12 is connected between the ends of belt 26 to form an endless loop 30. In another example, carriage 12 is connected to a belt 26 that itself forms an endless loop 30, and carriage 12 passes from control space 22 to manufacturing space 18 through an opening in the belt. In either case, belt 26 may be implemented as a passive device driven by carriage 12 through a carriage drive mechanism or belt 26 may be implemented as an active device that drives carriage 12 through a belt drive mechanism. Carriage 12 is connected to belt 26 along a first, front run 32 facing the manufacturing space and extending uninterrupted for the full range of travel of carriage 12. A second, back run 33 of belt 26 extends parallel to front run 32 in the control space. The motion of belt 26 back and forth with carriage 12 is indicated by arrows 34 in FIG. 1. The corresponding rotation of idler rollers 28 is indicated by arrows 36.

A tensioner 38 may be included to help maintain the desired tension in belt 26. In the example shown in FIG. 1, tensioner 38 includes a group of three closely spaced rollers 40, 42, 44 along back run 33. One or both of the inboard roller 42 and the outboard rollers 40, 44 are movable with respect to the other, as indicated by arrows 46, to adjust the tension in belt 26. Also, mechanical or electrostatic cleaners 48 may be used to remove debris and residue from belt 26.

Figure 3:
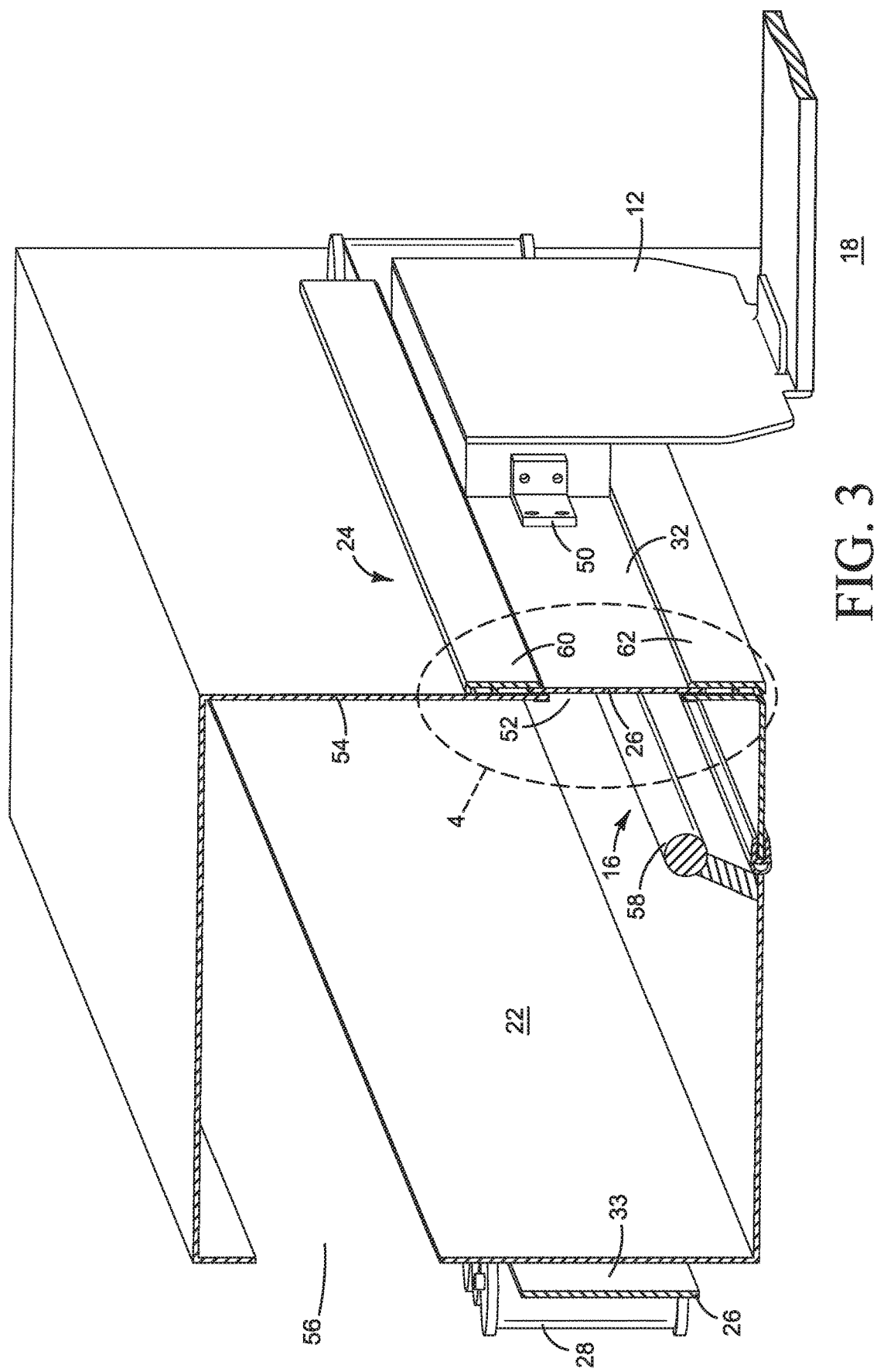
FIG. 3 is an isometric section taken along the line 3-3 in FIG. 2.

Referring now to the example barrier 24 shown in FIGS. 2-5, carriage 12 is connected to belt 26 along front run 32, for example with brackets 50. (Only one bracket 50 is visible in the figures.) Carriage 12 carries payload 14 in manufacturing space 18. Carriage 12 extends from manufacturing space 18 to control space 22 through a channel 52 (FIGS. 3 and 4) in a housing or other suitable containment 54. Channel 52 extends across the full range of travel of carriage 12. Also, as shown in FIG. 3, containment 54 includes an opening 56 to access control space 22. In this example, carriage 12 moves along a rail 58 supported by containment 54. Other suitable configurations for containment 54 are possible. For example, carriage 12 may be supported on a rail, chassis or other support distinct from containment 54. In other examples, control space 22 may be completely exposed at the back of containment 54.

Figure 4:
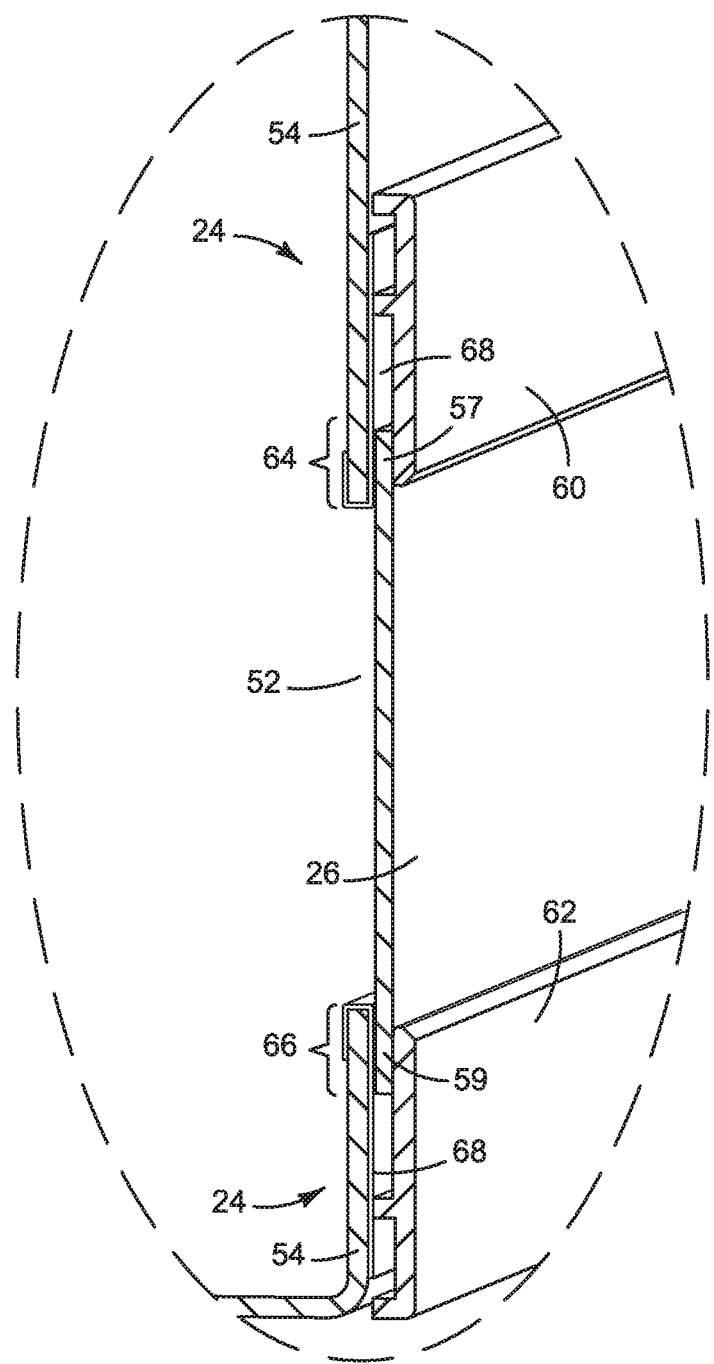
FIG. 4 is a detail from FIG. 3.

Referring specifically to FIGS. 3 and 4, belt 26 spans the full height of carriage channel 52 such that the top 57 and bottom 59 of belt 24 overlap the edge of container 54 along the top and bottom of channel 52, respectively. In this example, barrier 24 also includes cover panels 60, 62 each covering the top and bottom of belt 24 at the corresponding overlap 64, 66 between belt 24 and channel 52, to provide additional protection against contaminants entering control space 22 through channel 52. Also in this example, a mylar strip or other suitable lubricant 68 is interposed between belt 24 and containment 54 to reduce friction along overlaps 64, 66.

Figure 5:
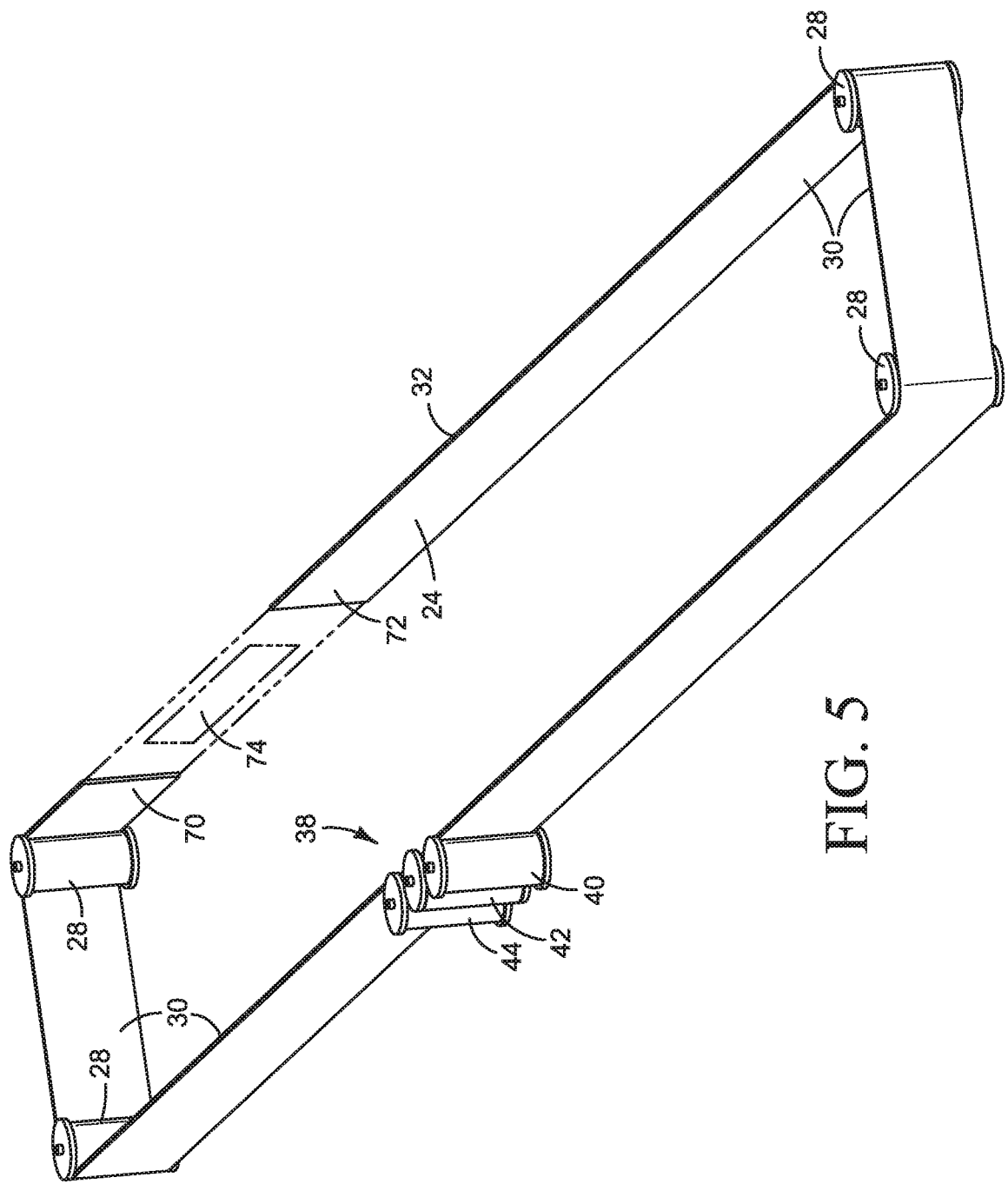
FIG. 5 is a detail of the belt in the example barrier shown in FIG. 2-4.

FIG. 5 is a detail of barrier belt 24. Referring to FIG. 5, as noted above, an endless loop 30 may be formed by a belt 26 together with the carriage connected between belt ends 70, 72, shown in solid lines in FIG. 5, or belt 26 may itself form endless loop 30 with the carriage passing through an opening 74 in the belt, shown in phantom lines in FIG. 5. While any suitably tough, flexible material may be used for belt 24, the characteristics of the belt may be selected to minimize friction and adapted to a particular barrier application. For example, a thermally insulating or reflecting material may be desirable for applications in which the belt is to function as a barrier to heat contamination. For another example, a nonporous or non-stick material may be desirable for applications in which the belt is to function as a barrier to sticky debris or aerosols, to help prevent contaminants accumulating on the belt.

Figure 6:
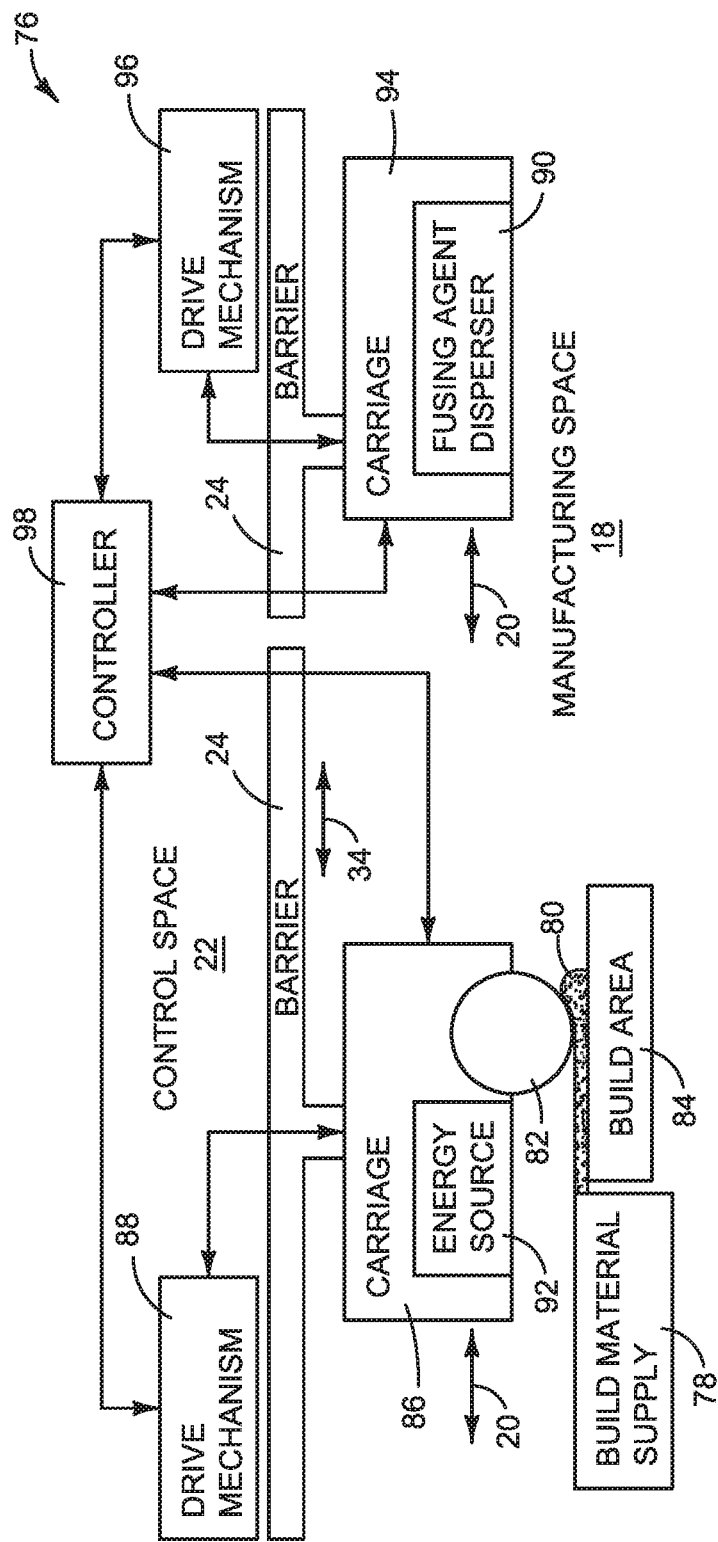
FIG. 6 is a diagram illustrating an additive manufacturing machine implementing one example for a movable contaminant barrier.

FIG. 6 is a block diagram illustrating an additive manufacturing machine 76 implementing movable contaminant barriers 24, such as the example barriers 24 shown in FIGS. 1-5. Referring to FIG. 6, machine 76 includes a supply 78 of a build material 80 and a roller or other suitable spreader 82 to spread build material 80 over a build area 84. Roller 82 is mounted to a carriage 86 that carries roller 82 back and forth over build area 84 at the urging of a drive mechanism 88. Additive manufacturing machine 76 also includes a fusing agent dispenser 90 and a source 92 of light or other fusing energy. In this example, fusing agent dispenser 90 is mounted to a carriage 94. Dispenser carriage 94 carries fusing agent dispenser 90 back and forth over build area 84 at the urging of a drive mechanism 96.

Additive manufacturing machine 76 includes a controller 98 with the processing resources, memory and instructions, and the electronic circuitry and components needed to control the operative elements of machine 76. In one example operation, build material 80 is dispensed from supply 78 and spread with roller 82 as carriage 86 moves over build area 84. A fusing agent is selectively applied to layered build material in a pattern corresponding to an object slice, as fusing agent dispenser 90 on carriage 94 is moved over build area 84. Energy source 92 is energized to expose the patterned area to light or other electromagnetic radiation to fuse build material where fusing agent has been applied, as carriage 86 carrying energy source 92 is moved over build area 84. The fusing agent absorbs energy to help sinter, melt or otherwise fuse the patterned build material. Manufacturing proceeds layer by layer and slice by slice until the object is complete.

In this example, both carriages 86, 94 are connected to a contaminant barrier 24. As described above with reference to FIGS. 1-5, each barrier 24 blocks heat, debris and other contaminants in manufacturing space 18 from entering control space 22 along the path between spaces 18, 22 traversed by carriages 86, 94. FIG. 6 illustrates just one possible example for the configuration of an additive manufacturing machine to implement a movable contaminant barriers. Other configurations are possible. And, examples of a movable contaminant barrier may be implemented in other machines and for purposes other than additive manufacturing.

The examples shown in the figures and described above illustrate but do not limit the patent, which is defined in the following Claims.

"A", "an", and "the" as used in the Claims means at least one.

The invention claimed is:

1. An apparatus for an additive manufacturing machine, comprising:
a dispenser carriage to carry a fusing agent dispenser over a build area in a manufacturing space to dispense a fusing agent on to a build material in the build area;
a spreader carriage to carry a spreader over the build area in the manufacturing space to spread the build material over the build area;
a drive mechanism in a control space to move the carriages along a path between the control space and the manufacturing space; and
a belt movable with the carriages to block contaminants in the manufacturing space from passing to the control space along the path, the belt separate from the drive mechanism and movable at the urging of the carriages.

2. The apparatus of claim 1, where the dispenser carriage extends from the control space to the manufacturing space.

3. The apparatus of claim 1, where the belt is connected to the dispenser carriage to make an endless loop wrapping multiple rollers.

4. The apparatus of claim 1, where the belt comprises an endless loop belt connected to the dispenser carriage and wrapping multiple rollers.

5. The apparatus of claim 1, where the belt includes a first run in the manufacturing space connected to the dispenser carriage and a second run opposite the first run in the control space.

6. An additive manufacturing machine, comprising:
a build area in a manufacturing space;
a spreader in the manufacturing space to spread a build material over the build area;
a fusing agent dispenser in the manufacturing space to dispense a fusing agent on to the build material in the build area;
a spreader carriage to carry the spreader over the build area;
a dispenser carriage to carry the fusing agent dispenser over the build area;
a drive mechanism in a control space to move the carriages along a path between the control space and the manufacturing space;
a belt barrier movable with the carriages along the path to block contaminants in the manufacturing space from entering the control space, the belt separate from the drive mechanism and movable at the urging of the carriages.

7. The machine of claim 6, where the drive mechanism includes a rail in the control space and the dispenser carriage is movable along the rail.

8. The machine of claim 6, where the barrier includes a belt covering the path.

* * * * *